Figure 1:
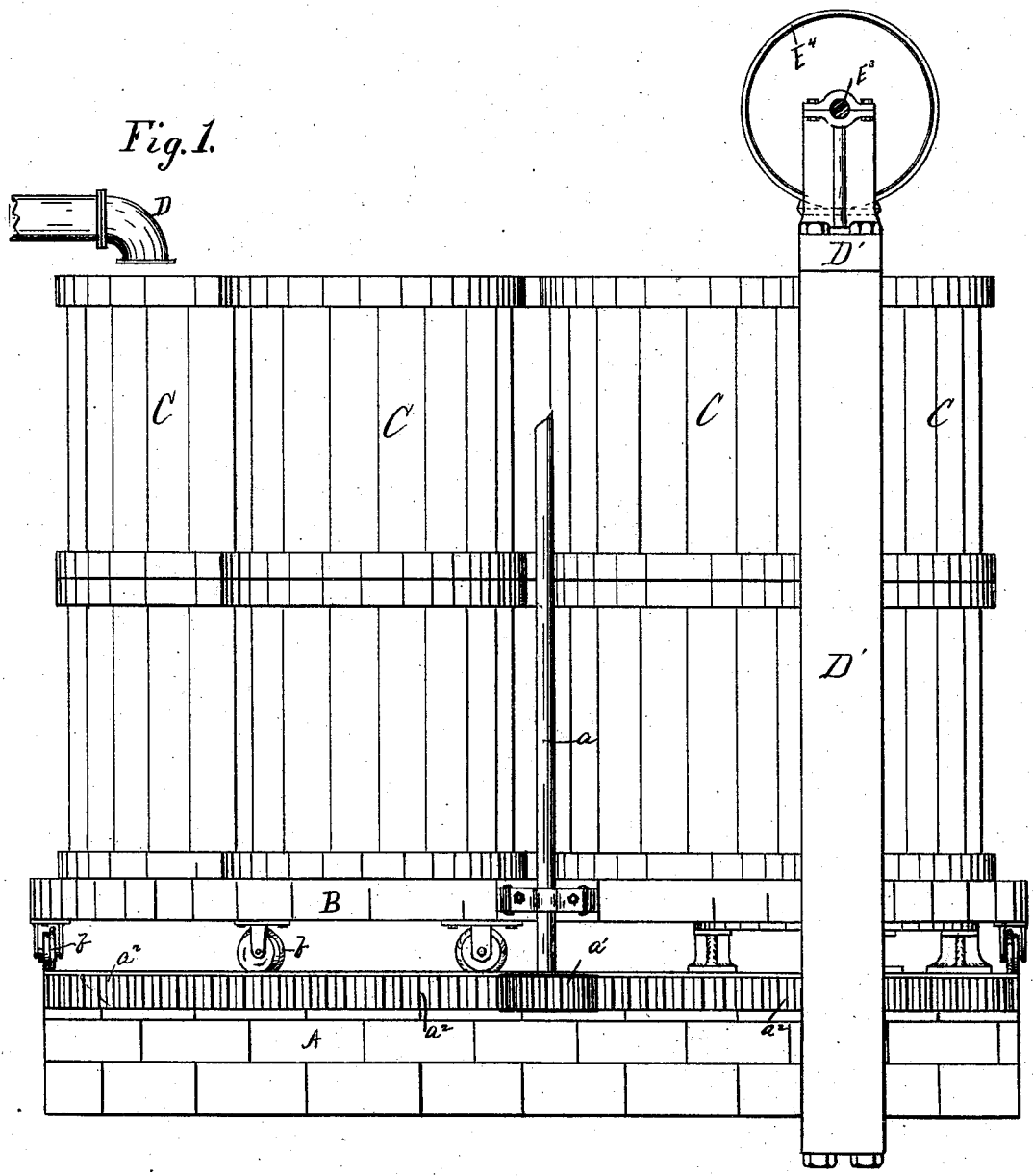

(No Model.) 4 Sheets—Sheet 1.

W. H. SMITH.

APPARATUS FOR RECOVERING FOOD PRODUCT FROM DISTILLERY SWILL.

No. 260,427. Patented July 4, 1882.

WITNESSES:

INVENTOR:

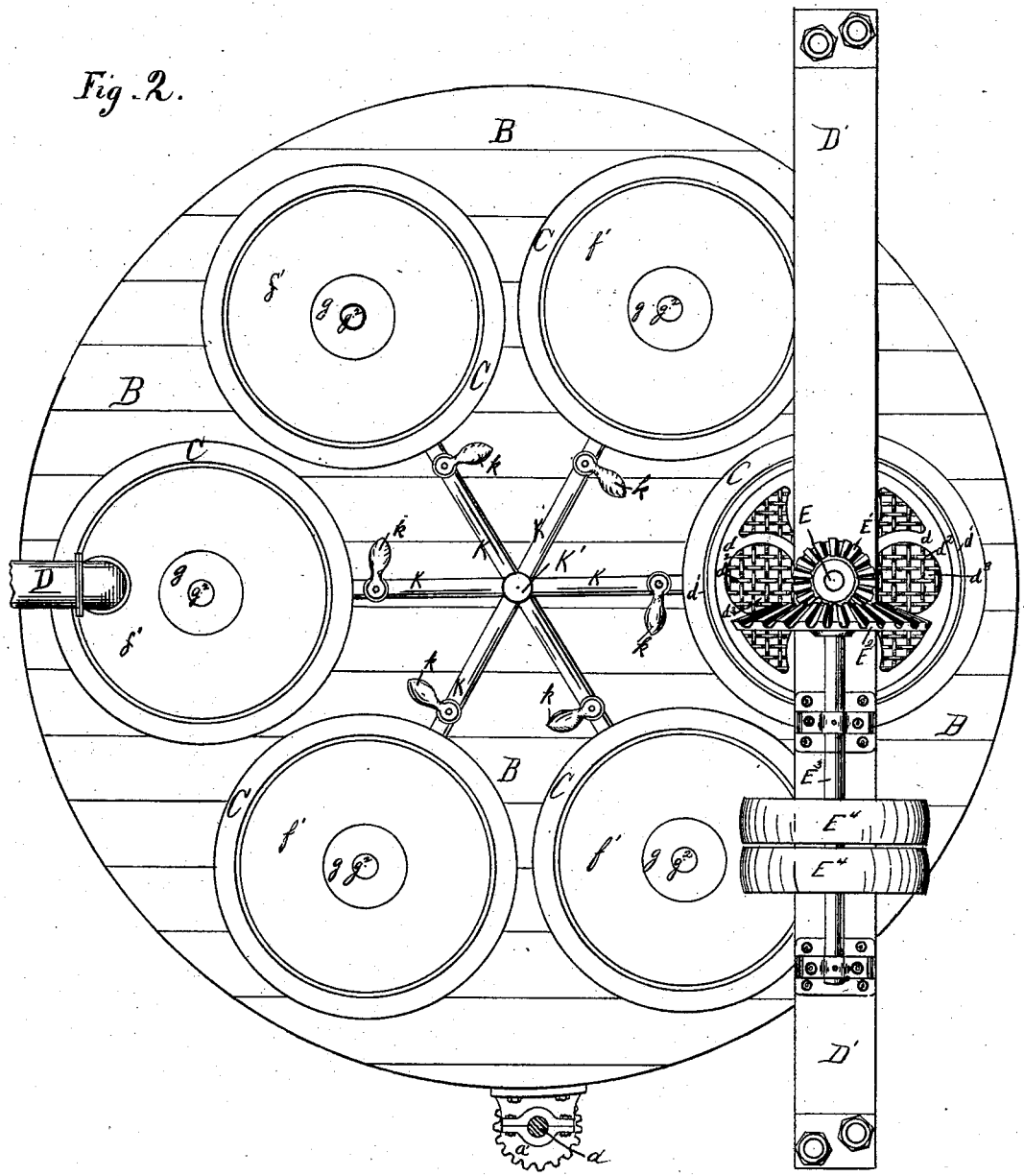

(No Model.) 4 Sheets—Sheet 3.
W. H. SMITH.
APPARATUS FOR RECOVERING FOOD PRODUCT FROM DISTILLERY SWILL.
No. 260,427. Patented July 4, 1882.
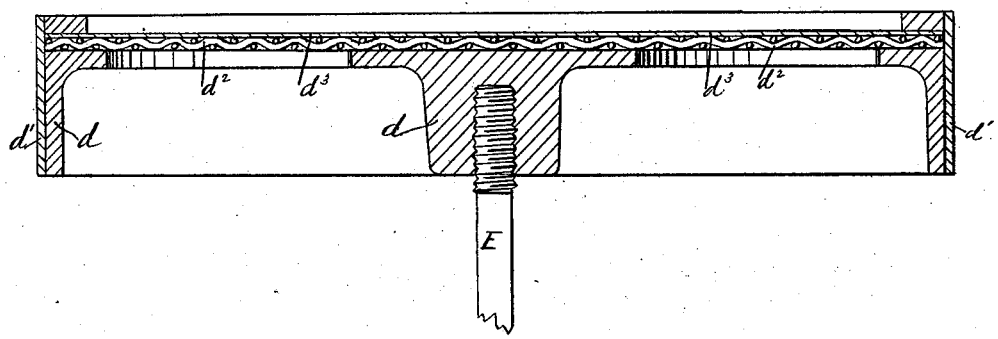
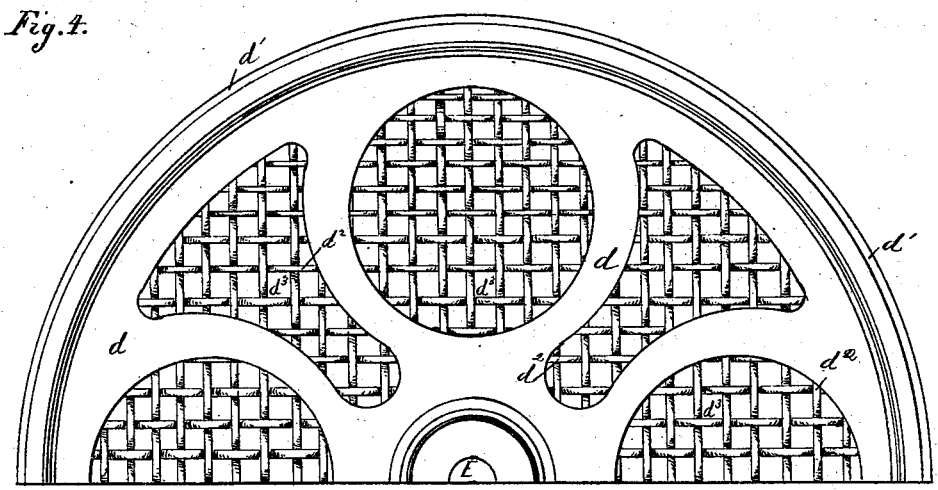

(No Model.)  4 Sheets—Sheet 4.
W. H. SMITH.
APPARATUS FOR RECOVERING FOOD PRODUCT FROM DISTILLERY SWILL.
No. 260,427.  Patented July 4, 1882.
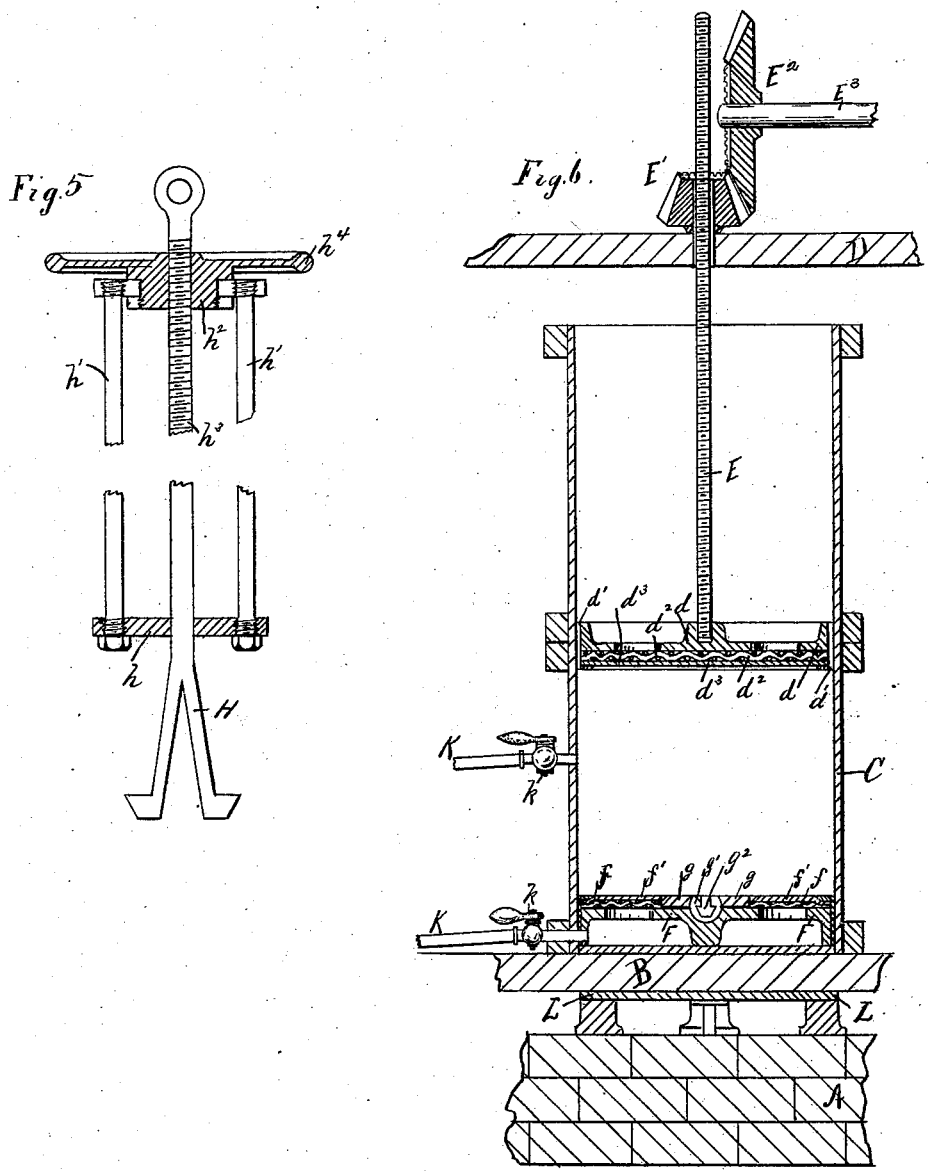
WITNESSES:
Everett Brown
Edmund Adcock
INVENTOR:
William Harrold Smith

UNITED STATES PATENT OFFICE.

WILLIAM HARROLD SMITH, OF CHICAGO, ILLINOIS.

APPARATUS FOR RECOVERING FOOD PRODUCTS FROM DISTILLERY-SWILL.

SPECIFICATION forming part of Letters Patent No. 260,427, dated July 4, 1882.

Application filed March 10, 1881. (No model.)

*To all whom it may concern:*

Be it known that I, WILLIAM HARROLD SMITH, of Chicago, in the county of Cook and State of Illinois, have invented certain new and useful Improvements in Apparatus for Recovering Food Products from Distillery-Swill, of which the following is a specification.

The object of this invention is to provide a practical and efficient means for separating the food products contained in the refuse or swill from distilleries from the water in which the same is held in solution or mechanical admixture.

Although distillery-swill contains a large amount of nutritive substance valuable as food for cattle, heretofore it has been little utilized, especially in the summer season, owing to the fact that the swill, containing, as it does, a large percentage of water, cannot be transported profitably to any considerable distance, and is not in a desirable form for feeding even in the winter time, while in warm weather it will so soon ferment and sour that but a small proportion of it can be used. The percentage of water contained in the swill is so great that it cannot be cheaply or economically evaporated, although that method has heretofore been employed to some extent.

My present invention consists in a large cylindrical tub or tank, in which the swill may be allowed to stand a few hours, until the greater portion of the food products have settled to the bottom, leaving the upper portion comparatively clear water, in connection with a filter-plunger having a wire bottom covered with cloth or felt, and adapted to fit inside the tank and to be forced down slowly upon the swill, causing the water to rise through the filter without agitating the contents below, while the food products are pressed down thereby into a cake in the bottom of the tank. By reason of the filter-plunger being arranged to press down from above on top of the swill, the food products having been first allowed to partially settle, the tendency of the glutinous and farinaceous substances to stop or clog up the filter, and thus prevent the water passing through the same, is overcome, and I am therefore thus enabled to very easily and effectually separate the water from the food products of the swill.

The tank is provided with a stop-cock and escape-pipe at suitable height for the purpose of drawing off the water above the filter-plunger, and with a movable false bottom adapted to be lifted out of the tank by means of a crane for the purpose of removing the food products from the tank. This false bottom I also make in the form of a filter, and provide an escape-pipe and stop-cock at the bottom of the tank, so that a portion of the water may be drained off in this way. The false bottom is lifted by means of a spring-catch attached to a crane, which fits in a ball-socket in the movable bottom, so that when the bottom is raised above the tank it may be tilted to cause the cake of food product to slide off the same into a receiving-bin. I mount several of these tanks on a large turn-table, so that they all may be brought in turn under the filter-plunger and the lifting-crane, and so that some of them may be standing full of swill, for the purpose of allowing the food products to partially settle, while others are being filled, filtered, and emptied.

My invention also consists in the novel devices and combinations of devices herein described.

In the accompanying drawings, which form a part of this specification, and in which similar letters of reference indicate like parts, Figure 1 is a side elevation of a device embodying my invention. Fig. 2 is a plan view of the same. Fig. 3 is a central vertical section of the filter-plunger. Fig. 4 is a plan view of part of the same. Fig. 5 is a central vertical section of the lifting device, and Fig. 6 is a central vertical section of one of the tanks in position under the filter-plunger.

In said drawings, A represents the base or foundation upon which the turn-table B rests, and *b* are the wheels of the turn-table, which travel on a suitable track on the foundation A. The tanks C for holding the swill are mounted on this turn-table, which is turned by means of arms, a crank, or other suitable device secured to the shaft *a*, carrying a pinion, *a'*, at its lower end, which meshes with the circular rack or stationary gear $a^2$, secured to the foundation. The bearings of the shaft $a$ are secured to the turn-table. The shaft $a$ may be operated by power from the engine instead of by hand, if desired.

D is the delivery-pipe, by which the tanks are filled with swill, and D' is the frame for supporting the filter-plunger and the mechanism for operating the same. The filter-plunger consists of a perforated or honey-combed circular plate, $d$, provided with a rubber or other suitable packing, $d'$, on its cylindrical surface, so as to fit the interior of the tank, and covered on its under side with a wire screen, $d^2$, which itself is covered with felt and cloth, $d^3$, or other suitable filtering material. The honey-combed plate $d$ serves to support and give strength to the wire screen, and the wire screen supports the felt or cloth.

The plunger-shaft E is provided with threads, and is raised and lowered by means of the bevel-gear nut E', driven by the bevel-gear $E^2$ on the shaft $E^3$. The shaft $E^3$ is mounted in suitable bearings in the frame, and is driven by the driving-pulleys $E^4$, secured thereto.

F is the perforated plate of the movable bottom, covered with a wire screen, $f$, and cloth or felt $f'$, so as to allow the filtering of water through the same, and provided with a circular plate, $g$, bolted to the plate F, and inclosing the ball-socket $g'$, which is provided with an interior opening, $g^2$, similar in shape to the spring-catch H. The spring-catch H is attached to a crane for the purpose of lifting out the movable bottom from the tank. When the movable bottom is lifted above the tank the ball-socket $g'$ permits the bottom to be tilted for the purpose of causing the cake of food product to slide off the same into the receiving-receptacle. When the bottom is again lowered into the tank the spring-catch is caused to release the same by means of the compressing-collar $h$, carried on the frame $h'$, which is raised and lowered by the screw-nut $h^2$, working on the threaded shaft $h^3$ of the spring-catch. The frame $h'$, fitting against the sides of the tank, serves to guide the catch into the opening in the ball-socket as the catch is lowered. The rim $h^4$, which is secured to the nut $h^2$, projects over the edge of the tank for convenience in operating the spring-catch. The escape-pipes K lead from each tank to a central vertical pipe, K', which passes down through the center of the foundation, for drawing off the water that has passed through the filters. From each tank two pipes lead to the central pipe—the upper one for drawing off the water above the filter-plunger and the lower one for draining off the water that filters through the movable bottom. Each of these pipes is provided with a stop-cock, $k$, which is opened when it is desired to draw off the water. I usually make the tanks of such size as to hold from ten to forty tons of swill; but they may be made of any suitable size.

Instead of mounting the tanks on a turn-table, a separate filter-plunger may be employed for each tank, and some of the advantages of my invention secured in that way. I however prefer to construct the apparatus as described and shown.

To give additional support to the turn-table at the point under the filter-plunger, I provide a base-plate or support, L, resting upon the masonry, of about the diameter of one of the tanks, and of such height that the turn-table will just slide or ride over the same.

In operation the swill is first delivered into the tanks through the delivery-pipe, and allowed to stand from one to three hours to permit the solid particles contained in the swill to partially settle to the bottom, when the turn-table is turned so as to bring one of the tanks under the filter-plunger, when the same is pressed down by means of the screw, causing the water to filter upward through the plunger, when the same is drawn off through the escape-pipe. The filter-plunger is then withdrawn, and the spring-catch lowered by means of a crane and caused to pass down through the cake of compressed material and caused to enter the ball-socket, when the movable bottom is lifted out and the cake of material delivered into the receptacle. When the filter-plunger is lifted above the tank the material adhering to the bottom thereof should be scraped off each time, so as to permit the free passage of the water through the same. By this means, arranged to filter the water upward through the plunger instead of downward, as heretofore has been done, I am enabled to combine in a single apparatus both deposition and filtering, as a means of separating the food products from the water contained in the swill. The movement of the turn-table causes no agitation of the swill in the tanks to interrupt the process of deposition of the food products to the bottom; and to prevent agitation of the swill I prefer a screw as the means of operating the filter-plunger, although other means may be employed. After the food products have been thus separated from the mass of water in the swill, they may be then dried and put in convenient form for transportation and use.

What I claim is—

1. The combination of the tank provided with a movable bottom, with the filter-plunger arranged to press down upon the swill in the tank, and mechanism for forcing said plunger downward to cause the water to filter upward through the plunger as the same is lowered, substantially as specified.

2. The combination of the tank, movable filter-bottom, filter-plunger, and mechanism for forcing said filter-plunger down upon the swill in the tank to cause the water to filter upward through the same, substantially as specified.

3. The combination of the tank, movable filter-bottom, ball-socket, and spring-catch for connecting the movable bottom with a lifting-crane, substantially as specified.

4. The combination of a series of tanks, mounted on a turn-table and provided with movable filter-bottoms, with a filter-plunger and escape-pipes K, arranged and operating substantially as specified.

5. The herein-described process of recovering food products from distillery-swill, consisting in first partially settling the same from one to three hours, and then filtering the liquid portion upward and removing the filtered liquid without agitating the solid particles deposited in the bottom, substantially as described.

WILLIAM HARROLD SMITH.

Witnesses:
EDMUND ADCOCK,
EVERETT BROWN.